United States Patent [19]

Takahashi et al.

[11] Patent Number: 5,378,381
[45] Date of Patent: Jan. 3, 1995

[54] POLYMER SOLID ELECTROLYTE COMPOSITION

[75] Inventors: Kenichi Takahashi; Kazuhiro Noda, both of Kanagawa, Japan

[73] Assignee: Sony Corporation, Tokyo, Japan

[21] Appl. No.: 104,911

[22] Filed: Aug. 12, 1993

[30] Foreign Application Priority Data

Aug. 14, 1992 [JP] Japan .................. 4-239040

[51] Int. Cl.⁶ .................. H01M 6/18; H01M 10/40
[52] U.S. Cl. .................. 252/62.2; 429/192
[58] Field of Search .................. 252/62.2, 518, 500; 429/192, 193

[56] References Cited

U.S. PATENT DOCUMENTS 3,551,211 12/1970 Grulke .................. 429/192
3,905,851 9/1975 Davis, Jr. .................. 429/202

FOREIGN PATENT DOCUMENTS 4795294 5/1974 Japan .
4795295 5/1974 Japan .

OTHER PUBLICATIONS

Hawley's Condensed Chemical Dictionary, 1987, pp. 44 and 727.

*Primary Examiner*—Prince Willis, Jr.
*Assistant Examiner*—Alan D. Diamond

[57] ABSTRACT

A polymer solid electrolyte comprises an organic polymer which has monomer units each having a pendant alkyl quaternary ammonium group at one end of a side chain, and a metal salt. The pendant alkyl quaternary ammonium group may be represented by the following formula

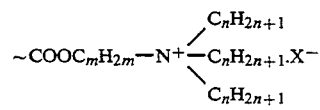

or

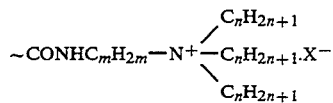

wherein m is an integer of from 1 to 3, n is an integer of from 1 to 4, and $X^-$ is a counter ion. The metal salt is preferably an aluminium halide.

16 Claims, No Drawings

POLYMER SOLID ELECTROLYTE COMPOSITION

BACKGROUND OF THE INVENTION

1. Field of the Invention

This invention relates to solid electrolytes and more particularly, to a polymer solid electrolyte composition which comprises aluminum-based conductive carriers and can thus exhibit high ionic conductivity with good film-forming properties, mechanical strength and flexibility.

2. Description of the Prior Art

Use of solid electrolytes to constitute totally solid cells contributes to improving the reliability of the cell without leakage of the content in the cell. Since the cell can be made thin and a plurality of cells may be built up, attention has been directed to solid electrolytes for use as a material in the fields of cells and other electrochemical devices.

The characteristic properties required as a solid electrolyte generally include (a) high ionic conductivity without involving electron conductivity, (b) good film-forming properties by which a thin film can be formed, and (c) good flexibility.

Broadly, solid electrolytes can be divided into two groups including an inorganic group and an organic group. The inorganic solid electrolytes have relatively high ionic conductivity but are poor in mechanical strength because they are crystalline in nature. This makes it difficult to obtain flexible films. This is very disadvantageous when inorganic solid electrolytes are applied to devices.

In contrast, polymer solid electrolytes made of organic materials are able to form flexible thin films. The thus formed thin film is imparted with good mechanical properties owing to the flexibility inherent to polymer. The thin film consisting of the polymer solid electrolyte can be appropriately adapted for the volumetric variation caused during the course of the ion-electron exchange reaction between the electrode and the polymer solid electrolyte. For this reason, the polymer solid electrolytes have been expected as a promising solid electrolyte material for high energy density cells, particularly, thin cells.

Composite materials comprising polyethylene oxide ($-CH_2CH_2O-)_n$, hereinafter abbreviated as PEO) and alkali metal salts such as Li salts, Na salts and the like are known as a polymer solid electrolyte which exhibits high alkali metal ionic conductivity. Various types of polymer solid electrolytes including the above composite material have been theoretically studied with respect to the mechanism of ionic conductivity and the molecular structure. Extensive studies have also been made on the application of the polymer solid electrolytes to electrochemical devices such as cells. The ionic conduction of polymer solid electrolytes is now considered to occur in the following manner: the alkali metal salt in a polymer matrix selectively ionizes an amorphous sites in the polymer matrix and moves by diffusion along the electric field in the matrix thereby achieving the ionic conduction. For instance, it has now been accepted that with composite materials made of PEO and alkali metal salts, the alkali metal ions form a complex with the oxygen atom at the ether bond of the main chain which has a high dielectric constant and the molecule chain suffers segment movement by means of heat at the amorphous sites, thereby showing the ionic conductivity.

However, the polymer solid electrolytes have the problem that they are smaller in ionic conductivity in the vicinity of room temperature than solid electrolytes made of inorganic materials. In addition, improvements in the ionic conductivity bring about the problem that film-forming properties and flexibility are lowered instead.

For instance, with the composite material film consisting of PEO and alkali metal salts wherein the composite material has a molecular weight of about 10000, good film-forming properties are obtained with an ionic conductivity being as high as $10^{-3}$ to $10^{-4}$ $Scm^{-1}$ at temperatures of 100° C. or higher. Since the composite material is crystalline in nature, however, the ionic conductivity abruptly lowers at temperatures not higher than 60° C. and is decreased to a very small value of not higher than approximately $10^{-7}$ $Scm^{-1}$ at room temperature. This disenables the composite material to be used as a material for ordinary cells which are employed at room temperature. In order to improve the ionic conductivity, attempts have been made to suppress the crystallinity by introduction of crosslinking agents such as toluene-2,4-diisocyanate(TDI) but in vain. Although the ionic conductivity in the vicinity of room temperature can be improved by forming the composite material film of a composite material whose molecular weight is not higher than approximately 10000, film-forming properties are considerably lowered, making it difficult to form a film. Moreover, for improving the ionic conductivity, the concentration of an alkali metal salt may be increased. However, this will cause the glass transition point, Tg, of the polymer to increase, thus resulting in a lowering of the ionic conductivity. As will be apparent from the foregoing, it is not possible to increase both the carrier density and the ionic conductivity.

Other types of polymer solid electrolytes are known, which are similar to the composite materials consisting of PEO and alkali metal salts. Such electrolytes are ones which have PEO structures at side chains. This polymer solid electrolyte has an ionic conductivity ranging from $10^{-5}$ to $10^{-4}$ $Scm^{-1}$ and is thus slightly improved over the composite material consisting of PEO and alkali metal salts. However, this ionic conductivity is not satisfactory in practical applications. In addition, film-forming properties and flexibility are not satisfactory.

On the other hand, attention has been paid to lithium ion cells or nickel hydrogen cells for use as a high capacitance cell. Now, there is a strong demand for developments of materials for secondary cells which are small in size, light in weight and high in capacitance. Aluminium cells have been recently studied as one of newly developing cells. Theoretically, aluminium cells are assumed to have a high density capacitance which is as high as four times per volume that of conventional lithium ion cells.

However, aluminium cells which have been experimentally made up to now are those cells which make use of liquid electrolytes such as non-aqueous electrolytes, ionic liquids (fused salts at normal temperatures) and the like. Aluminium cells in which solid electrolytes are used have never been in practical use.

Certain types of pyridinium or imidazolinium quaternary ammonium salts and aluminium chloride can form molten salts, which exhibit very high ionic conductivity. Thus, attention has been directed to these salts for use as a cell material. More particularly, if the molten salt is applied to a polymer solid electrolyte, it will be realized to provide polymer solid electrolytes which are in a solid polymer state and have such properties as of ionic liquid inherent to the molten salt, thereby obtaining a semi-solid, highly conductive polymer solid electrolyte.

However, the polymer solid electrolyte comprising the pyridinium or imidazolinium quaternary ammonium salt has the problem that it has the possibility of electronic conduction through $\pi$ electrons. For the application of this type of polymer solid electrolyte to electrochemical devices, mechanical strength and flexibility should be further improved.

SUMMARY OF THE INVENTION

It is accordingly an object of the invention to provide a polymer solid electrolyte which can solve the problems of the prior art polymer solid electrolytes and exhibits ionic conductivity in the vicinity of room temperature with a freedom from electronic conductivity.

It is another object of the invention to provide a polymer solid electrolyte which has good film-forming properties, mechanical strength and flexibility.

According to the present invention, there is provided a polymer solid electrolyte which comprises an organic polymer which has monomer units, each having an alkyl quaternary ammonium group at an end of a side chain thereof, and a metal salt.

Preferably, the alkyl quaternary ammonium group of the polymer should be of the following formula (1) or (2)

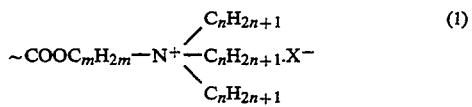

wherein m is an integer of from 1 to 3, n is an integer of from 1 to 4, and $X^-$ is a counter anion, or

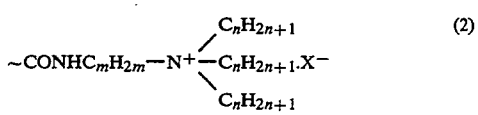

wherein m, n and $X^-$ have, respectively, the same meanings as defined above.

Preferably, the metal salt is an aluminium halide. More preferably, the aluminium halide is selected from $AlCl_3$, $AlBr_3$ and $AlI_3$.

The polymer solid electrolyte defined above is substantially free of any electronic conductivity and exhibits high ionic conductivity in the vicinity of room temperature. In addition, the solid electrolyte has good film-forming properties, mechanical strength and flexibility.

DESCRIPTION OF THE PREFERRED EMBODIMENTS

The organic polymers in the polymer solid electrolyte of the invention should meet the following requirements. The organic polymer contains a high density of carrier ions and have groups which take part in an appropriate degree of interaction with the carrier ions. Moreover, the polymer should keep its amorphous state at low temperatures by which a satisfactory segment movement is ensured. The polymer is substantially free of any electronic conduction. To this end, we have found that polymers having alkyl quaternary ammonium groups at ends of side chains which are substantially free of electronic conduction through $\pi$ electrons can meet the above requirements.

Once again, the polymer solid electrolyte of the invention comprises an organic polymer having an alkyl quaternary ammonium group at ends of side chains, and a metal salt.

Preferable organic polymers include those polymers which have pendant alkyl quaternary ammonium groups of the following formula (1) or (2) at ends of side chains

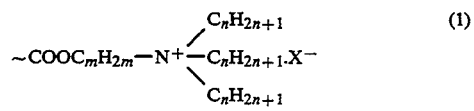

wherein m is an integer of from 1 to 3, n is an integer of from 1 to 4, and $X^-$ is a counter anion, or

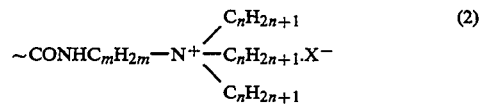

wherein m, n and $X^-$ have, respectively, the same meanings as defined above.

The backbone structure of the polymer is not critical. The counter anion $X^-$ of the quaternary ammonium group is preferably $Cl^-$, $Br^-$ or $I^-$.

Examples of the polymers include those polymers obtained by homopolymerization or copolymerization, with comonomers, of a dimethylaminoethylmethacrylate methyl chloride quaternary ammonium salt (hereinafter abbreviated as DMAEMA-Cl) of the following formula (3) which has an alkyl quaternary ammonium group of the above formula (1) wherein m=2, n=1 and X=Cl or a dimethylaminopropylmethacrylamido methyl chloride quaternary salt (hereinafter abbreviated as DMAPMAA-Cl) of the formula (4) which has an alkyl quaternary ammonium group of the above formula (2) wherein m=3, n=1 and X=Cl

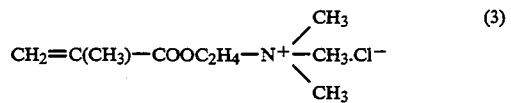

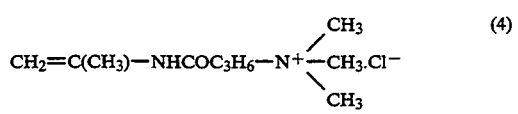

The comonomers used for the copolymerization include, for example, acrylic monomers of the formulas, $CH_2$=CHCOOH, $CH_2$=CHCOOR in which R represents an alkyl group, $CH_2$=CHCOO$(CH_2CH_2O)_n$CH$_3$ in which n is an integer of 1 to 23, and the like, methacrylic monomers of the formulas, $CH_2$=CCH$_3$COOH, $CH_2$=CCH$_3$COOR in which R represents an alkyl group, $CH_2$=CCH$_3$COO$(CH_2CH_2O)_n$CH$_3$ in which n is an integer of 1 to 23, and the like, and other monomers such as $CH_2$=[COO$(CH_2CH_2O)_n$CH$_3$]$_2$ in which n is an integer of from 1 to 23, $CH_2$=CH$(C_6H_5)$, $CH_2=CHCN$, $CH_2=CHCONH_2$, vinylpyrrolidone, and the like.

For the preparation of organic polymers through copolymerization of these monomers, it is possible to control physical and chemical properties of the resulting organic polymer by changing the ratio between the quaternary ammonium group-containing monomer and other comonomers. If the content of methyl acrylate or methyl methacrylate is increased, the resultant copolymer is lowered in moistureproofing on comparison with homopolymers of DMAEMA-Cl and DMAPMAA-Cl. When methacrylic monomers having the polyethylene oxide structure are increased in content, the resultant copolymer has a reduced degree of crystallinity, making it possible to obtain a soft, flexible film.

It is preferred that the ratio between the monomer of the formula (3) or (4) having the alkyl quaternary ammonium group and other comonomer is such that the the monomer of the formula (3) or (4) is present in an amount of not lower than 90 mol % of the total of the monomers constituting the resulting organic polymer although homopolymers of the formulas (1) to (4) may be used. If the content of the monomer having the alkyl quaternary ammonium group is smaller than 90 mol %, ionic conductivity and film-forming properties will lower.

The copolymerization may be conducted by any known process such as a radical polymerization process, a photopolymerization process or the like. According to any of these processes, the resultant polymer has such a monomer ration as that initially charged for the copolymerization.

The organic polymer used in the present invention may be blends of the thus copolymerized polymer with other types of polymers miscible with the copolymerized polymer.

The metal salts of the polymer solid electrolyte according to the invention may be any metal salts. Preferably, aluminium salts which are useful in realizing cells with a density capacitance higher than those cells using known lithium salts are used. Specific examples of the aluminium salts include $AlCl_3$, $AlBr_3$, $AlI_3$ and the like. In this connection, it is not always necessary that the halogen anion of the aluminium salt is the same as that of the alkyl quaternary ammonium group.

The ratio between the metal salt and the pendant alkyl quaternary ammonium group of the organic polymer should preferably be such that the ratio of the molecule of the metal salt and the alkyl quaternary ammonium group is in the range of 0.01 to 2.0.

The polymer solid electrolyte of the invention is obtained by mixing an organic polymer and a metal salt and uniformly dissolving them in a solvent therefor. Examples of the solvent include alcohols such as methanol, ethanol, propanol and the like The polymer solid electrolyte may be formed as a film by any known technique such as casting.

In the polymer solid electrolyte of the invention, the metal salt forms a complex with the counter anion of the alkyl quaternary ammonium salt at side chains of an organic polymer, thereby forming a metal complex having a quasi-tetrahedral structure. By this, ionic conductivity is considered as possible. Especially, where aluminium salts such as aluminium halides are used as the metal salt, ionic conductivity becomes significantly higher than that of lithium salts. Thus, cells having a high density capacitance can be realized. It will be noted here that since the organic polymers have no $\pi$ electrons, there is no possibility of electronic conduction owing to $\pi$ electrons.

Further, if the metal salt serving as carrier ions is contained at high concentration in the polymer solid electrolyte of the invention, film-forming properties are not significantly lowered and the conductivity is not abruptly lowered owing to the increase of a glass transition point, Tg. Accordingly, high ionic conductivity and good film-forming properties and flexibility can be all realized according to the invention by increasing the content of carrier ions.

The invention is more particularly described by way of examples

EXAMPLES 1 to 6

Preparation of Organic Polymers:

DMAEMA-Cl, DMAPMAA-Cl, methyl methacrylate (MA) and/or a methacrylic monomer $(CH_2=CCH_3COO(CH_2CH_2O)_9CH_3$, M-90G available from Shin Nakamura Chem. Ind. Co., Ltd.) were charged into a glass polymerization reactor at monomer ratios by mole % indicated in Table 1. Thereafter, 200 ml of methanol was further added as a solvent for polymerization to each of the mixtures, followed by addition of an AIBN (2,2'-azobis(isobutyronitrile)) radical polymerization initiator in an amount of from 0.2 to 1.0 mol % based on the total moles of the charged monomers and stirred to obtain a uniform solution. The polymerization reaction solution was placed in a vacuum line, followed by removal of dissolved air from the solution according to a known procedure. Thereafter, the container was sealed, followed by polymerization reaction in a shaking temperature controlled vessel-at 65° C. for 24 hours, thereby obtaining a viscous reaction solution. The thus obtained reaction solution was poured into acetone in an amount of 20 times greater than the reaction solution to obtain white precipitate. The precipitated was purified through precipitation from methanol-acetone. The products were fully dried by heating in vacuum. As a result, there were obtained intended organic polymers in yields of from 50 to 70%. The monomer ratios of the respective polymers were identified according to 1H-NMR in $CD_3OD$, revealing that such ratios were conformed with the ratios of the charged monomers.

TABLE 1

| Example | Monomer Ratios (mol %) | | | | Conductivity ($Scm^{-1}$) |
|---|---|---|---|---|---|
| | DMAEMA-Cl | DMAOMAA-Cl | MA | M-90G | |
| 1 | 100 | 0 | 0 | 0 | $2.2 \times 10^{-4}$ |
| 2 | 0 | 100 | 0 | 0 | $1.7 \times 10^{-4}$ |
| 3 | 95 | 0 | 0 | 5 | $2.8 \times 10^{-4}$ |
| 4 | 0 | 95 | 0 | 5 | $1.5 \times 10^{-4}$ |
| 5 | 90 | 0 | 5 | 5 | $1.1 \times 10^{-4}$ |
| 6 | 0 | 90 | 5 | 5 | $0.8 \times 10^{-4}$ |

Preparation of Polymer Solid Electrolyte Films:

Each organic polymer obtained above was mixed with methanol, stirred to obtain a homogeneous solution. While cooling, $AlCl_3$ was added portion by portion to the solution under agitation at a molar ratio of $AlCl_3$ to the alkyl quaternary ammonium group of $—NR_3^+$ of 0.1, i.e. $[Al^{3+}]/[—NR_3^+]=0.1$. The agitation was further continued until complete dissolution was attained. Subsequently, the solution was passed through a filter with a pore size of 0.45 μm to remove insoluble matters therefrom, followed by film formation by casting. More particularly, the solution was placed in a teflon disk with a flat bottom and the solvent was evaporated from the solution in an atmosphere of nitrogen in a hot chamber at 60° C. Thereafter, the resultant film was heated in vacuum to completely remove the solvent therefrom and dried to obtain a polymer solid electrolyte film.

The polymer solid electrolyte films obtained in this method were colorless, transparent films which were very flexible and had a thickness of from 20 to 150 $\mu$m.

Evaluation on Ionic Conductivity:

The respective polymer solid electrolyte films were subjected to measurement of ionic conductivity at room temperature (22° to 25° C.) in the following manner. Each film was sandwiched between platinum electrodes and was contacted under pressure so that the contact between the electrodes and the film was ensured, followed by analytical calculation from a semi-circular portion which was obtained according to a complex impedance method. In the case, the AC amplitude voltage was set in a range of from 30 to 100 mV and the AC frequency band ranged from $10^{-2}$ to $10^7$. The results are shown in Table 1.

From the table, it will be seen that the conductivity is pronouncedly improved over the case of known composite material films consisting of PEO and alkali metal salts.

EXAMPLES 7 to 14

The general procedure of Example 1 was repeated except that the amount of $AlCl_3$ was changed as indicated in Table 2, thereby forming polymer solid electrolyte films to determine conductivity. The results are shown in Table 2.

It will be noted that when the amount of $AlCl_3$ was increased to a level of $[Al^{3+}]/[-NR_3^+]=2.0$ or over, $AlCl_3$ was not completely dissolved and suspended in the cast solution, i.e. it was not possible to form a film wherein $AlCl_3$ was dissolved at an intended concentration.

TABLE 2

| Example | $[Al^{3+}]/[-NR_3+]$ | Conductivity (Scm$^{-1}$) |
| --- | --- | --- |
| 7 | 0.01 | 8.9 × 10$^{-5}$ |
| 8 | 0.05 | 1.8 × 10$^{-4}$ |
| 9 | 0.10 | 2.2 × 10$^{-4}$ |
| 10 | 0.20 | 3.3 × 10$^{-4}$ |
| 11 | 0.50 | 4.5 × 10$^{-4}$ |
| 12 | 1.0 | 4.0 × 10$^{-4}$ |
| 13 | 1.5 | 2.5 × 10$^{-4}$ |
| 14 | 2.0 | 2.6 × 10$^{-4}$ |

From Table 2, it will be seen that when the concentration of $AlCl_3$ is increased, the conductivity is not lowered extremely. Moreover, film-forming properties are not degraded with an increase of the concentration, with the tendency that the flexibility of the film is slightly lowered. In this system, the amount of $AlCl_3$ is preferably such that $[Al^{3+}]/[-NR_3^+]=0.02$ to 0.5.

EXAMPLES 15 to 19

The general procedure of Example 2 was repeated except that the amount of $AlCl_3$ was so changed as indicated in Table 3, thereby forming polymer solid electrolyte films to determine the conductivity. The results are shown in Table 3.

TABLE 3

| Example | $[Al^{3+}]/[-NR_3+]$ | Conductivity (Scm$^{-1}$) |
| --- | --- | --- |
| 15 | 0.02 | 6.5 × 10$^{-5}$ |
| 16 | 0.05 | 1.1 × 10$^{-4}$ |
| 17 | 0.20 | 2.0 × 10$^{-4}$ |
| 18 | 0.50 | 3.3 × 10$^{-4}$ |
| 19 | 1.0 | 1.8 × 10$^{-4}$ |

From Table 3, it will be seen that in this system, the amount of $AlCl_3$ is preferably such that $[Al^{3+}]/[-NR_3^+]$=about 0.5.

EXAMPLES 20 and 21

The general procedure of Example 1 was repeated using $AlBr_3$ or $AlI_3$ in place of $AlCl_3$, thereby forming polymer solid electrolyte films which were used to determine conductivity. The results are shown in Table 4. For reference, the results of Example 1 are also shown in Table 4.

TABLE 4

| Example | Aluminium Salt | Conductivity (Scm$^{-1}$) |
| --- | --- | --- |
| 1 | $AlCl_3$ | 2.2 × 10$^{-4}$ |
| 20 | $AlBr_3$ | 2.4 × 10$^{-4}$ |
| 21 | $AlI_3$ | 1.8 × 10$^{-4}$ |

From Table 4, it will be seen that all the aluminium salts serve well as conductive carriers.

What is claimed is:

1. A polymer solid electrolyte comprising a metal salt and an organic polymer having monomer units with said chains comprising alkyl quaternary ammonium groups, each of said groups having the following formula:

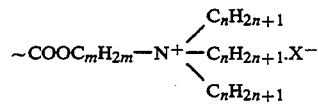

wherein m is an integer of from 1 to 3, n is an integer of from 1 to 4, and X$^-$ is a counter anion.

2. A polymer solid electrolyte according to claim 1, wherein X is Cl, Br or I.

3. A polymer solid electrolyte according to claim 1, wherein each monomer unit having said alkyl quaternary ammonium group is of the following formula

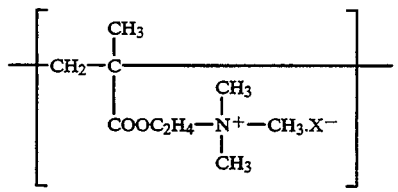

4. A polymer solid electrolyte according to claim 1, wherein said metal salt is an aluminum halide.

5. A polymer solid electrolyte according to claim 4, wherein said aluminum halide is $AlCl_3$.

6. A polymer solid electrolyte according to claim 4, wherein said aluminum halide is $AlBr_3$.

7. A polymer solid electrolyte according to claim 4, wherein said aluminum halide is $AlI_3$.

8. A polymer solid electrolyte comprising a metal salt and an organic polymer having monomer units with side chains comprising alkyl quaternary ammonium groups, each at said groups having the following formula:

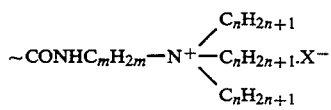

wherein m is an integer of from 1 to 3, n is an integer of from 1 to 4, and $X^-$ is a counter anion.

9. A polymer solid electrolyte according to claim 8, wherein X is Cl, Br or I.

10. A polymer solid electrolyte according to claim 8 wherein each monomer unit having said alkyl quaternary ammonium group is of the following formula

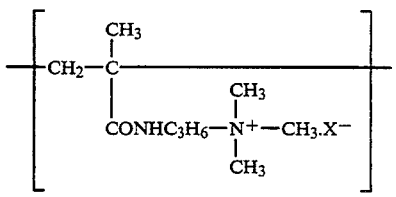

wherein X is Cl, Br or I.

11. A polymer solid electrolyte according to claim 8, wherein said metal salt is an aluminum halide.

12. A polymer solid electrolyte according to claim 11, wherein said aluminum halide is $AlCl_3$.

13. A polymer solid electrolyte according to claim 11, wherein said aluminum halide is $AlBr_3$.

14. A polymer solid electrolyte according to claim 11, wherein said aluminum halide is $AlI_3$.

15. A polymer solid electrolyte according to claim 1 or 8, wherein said monomer units are vinyl monomer units, and monomer units having said alkyl quaternary ammonium groups being present in the amount of not less than 90 mol % based on the total of all monomer units in the organic polymer.

16. A polymer solid electrolyte according to claim 1 or 8, wherein the molar ratio of said metal salt to said alkyl quaternary ammonium group is in the range of from 0.01 to 2.0.

* * * * *